H. C. MORRIS.
GAS METER ATTACHMENT.
APPLICATION FILED JULY 2, 1917.
1,288,963.
Patented Dec. 24, 1918.
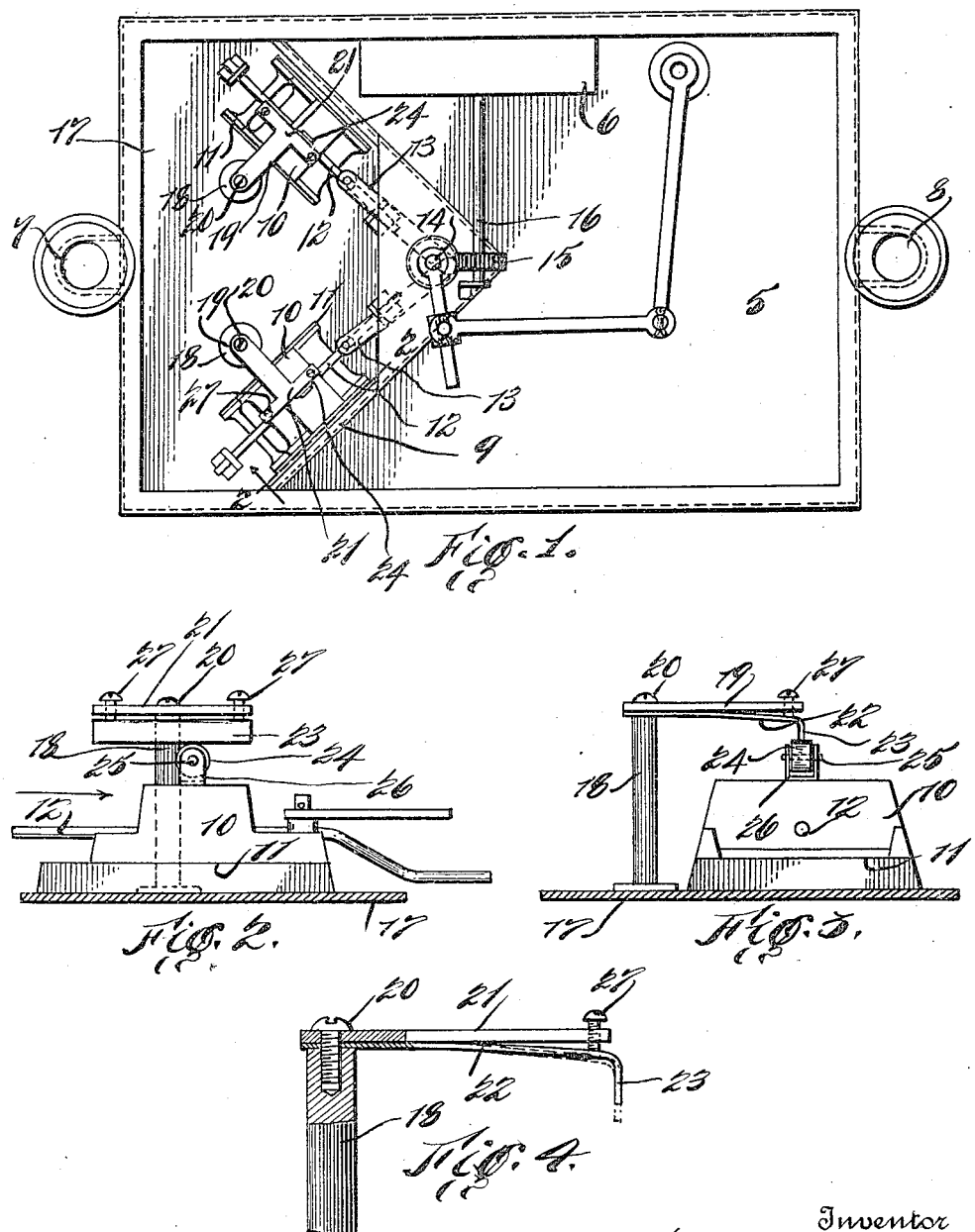

UNITED STATES PATENT OFFICE.

HENRY C. MORRIS, OF DALLAS, TEXAS.

GAS-METER ATTACHMENT.

1,288,963.　　　　Specification of Letters Patent.　　Patented Dec. 24, 1918.

Application filed July 2, 1917. Serial No. 178,117.

*To all whom it may concern:*

Be it known that I, HENRY C. MORRIS, a citizen of the United States, and a resident of the city of Dallas, in the county of Dallas and State of Texas, have invented certain new and useful Improvements in Gas-Meter Attachments, of which the following is a specification, reference being made to the accompanying drawings, forming a part thereof.

My invention relates to attachments for gas or other fluid meters designed to operate with sliding valves which open and close ports to permit gas or other fluid to go in and out of diaphragm chambers, which in turn operate the registering mechanism for the measurement of gas that may pass through the meter.

In meters of that type wherein the measurement of gas is accomplished by means of sliding valves and diaphragms operating registering mechanism of the meter, the valve covers operate unrestrictedly upon their seats, being normally held in place by their weight or by gravity. Therefore, while the meter is maintained in an upright position, the valve covers will remain properly seated and operate the mechanism for measuring flow of gas through the meter.

If, however, in this or similar types of meter, the meter be dislodged or moved from its normal upright position, the valve covers will be unseated and gas will pass through the meter without actuating the valves and without causing a registration of the flow of gas through the meter.

The objects of my invention, among other things, are to provide a simple and effective device operable in conjunction with these sliding valve covers whereby such valve covers, which are normally held in operative position by gravity when the meter is in its usual upright position, will be maintained in such operative position whenever the meter is accidentally or purposely tipped or tilted from its normal vertical position. In the embodiment illustrated, I have arranged a post or standard of suitable shape and size in the valve case which shall be located adjacent each of the valve covers and carry in superimposed position an overhead plate which shall at all times coact with a roller journaled on the top of each valve cover whereby the cover is held on its seat no matter if the meter be in its upright or tilted position.

Other objects and advantages of my improved attachment will be hereinafter set forth and particularly pointed out in the appended claims.

In the accompanying drawings, Figure 1 is a top plan view of a meter provided with my improvement, the cover of the valve case being removed;

Fig. 2 is an enlarged sectional view of one of the valve covers of a meter, the section being taken on the line 2—2 shown in Fig. 1;

Fig. 3 is an end view looking from the left in Fig. 2; and

Fig. 4 is an enlarged fragmentary detail of one of the supporting posts and yieldable bearing plates.

Similar numerals refer to similar parts throughout the several figures.

In the drawings, 5 indicates the gas meter having the register 6 secured to one side thereof, with the inlet pipe 7 and the outlet pipe 8 oppositely disposed to each other, as shown in Fig. 1. The mechanism for operating the register 6 is of well-known construction and arrangement within the valve case 9, and comprises the valve covers 10 sliding on the valve seats 11, which covers 10 carry rods 12 connected in turn by links 13 to a vertically disposed shaft 14 which is rotated by the diaphragms in the meter (not shown), through suitable arms and links, to rotate the gear wheel 15 mounted on the shaft 16 connected with the registering devices in the register 6. As this mechanism constitutes, in itself, no part of my invention, and is old and well-known, its construction and operation need not be described.

On the floor 17 of the valve case 9 are mounted supporting posts 18 adjacent the valve covers 10 and valve seats 11 as shown in Fig. 1. On the top of each of the posts 18 are adjustably and removably secured the bars 19 by the screws 20, the bars 19 being T-shaped and mounted so as to lie in substantially horizontal position within the meter 5. The cross-pieces 21 of the bars 19 have a length substantially that of the movement of the valve covers 10 as they slide on their seats 11, and beneath the bars 19 is secured the resilient bearing plate 22, which is preferably L-shaped as shown in Figs. 3 and 4, the depending portion 23 being adapted to engage and coact with the reciprocating rollers 24 supported on trunnions 25 journaled in the U-shaped supports 26 mounted on the top of the valve covers 10, as shown in Figs. 2 and 3. The cross pieces 21 carry adjusting screws 27 at either end, the tips of such screws bearing on the plate 22 beneath so as to adjust the relative positions of the under surfaces of the depending portions 23 to the peripheries of the rollers 24, as the valve covers 10 slide to and fro on the valve seats 11 in the normal operation of the meter.

When the meter 5 is in normal upright position the rollers 24 will lightly contact with the depending portion 23 of the bearing plates 22; whenever the meter is tilted from its upright position the valve covers will still be maintained in operative position in their respective seats because the depending portions 23 of the plates 22 will at all times engage and coact with the rollers 24 to hold the covers in place, and hence the rods 12 will always operate the register 6, no matter at what angle the meter may be supported.

It will be understood that the mechanism shown may be variously modified and changed without departing from the limits and advantages of my invention, provided the operation is substantially as indicated; and it will also be understood that the invention is not limited to any particular form or construction of the parts except in so far as such limitations are specified in the claims.

I claim as my invention:

1. In a gas meter attachment, the combination with the register of the meter, of a sliding valve cover indirectly controlling said register, and means having a superimposed anti-frictional engagement with, and arranged in parallelism with the line of movement of, said cover during its reciprocating movements for holding said cover at all times in operative position when the meter is moved from its upright position.

2. In a gas meter attachment, the combination with the register of the meter, of a plurality of sliding valve covers indirectly controlling said register, and means having a superimposed anti-frictional engagement with, and arranged in parallelism with the line of movement of, said covers at all times during their reciprocating movement for holding said covers in operative position when the meter is moved from its upright position.

3. In a gas meter attachment, the combination with the register of the meter, of a sliding valve cover indirectly controlling said register, and means having a superimposed anti-frictional engagement with, and arranged in parallelism with the line of movement of, said cover at all times during its reciprocating movements for yieldingly holding said cover in operative position when the meter is moved from its upright position.

4. In a gas meter attachment, the combination with the register of the meter, of a plurality of sliding valve covers indirectly controlling said register, and means having a superimposed antifrictional engagement with, and arranged in parallelism with the line of movement of, said covers at all times during their reciprocating movements for yieldingly holding said covers in operative position when the meter is moved from its upright position.

5. In a gas meter attachment, the combination with the register of the meter, of a sliding valve cover indirectly controlling said register, a roller transversely mounted on said cover, and a bearing plate directly superimposed in parallelism with the line of movement of said cover at all times to engage and coact with the roller during the reciprocating movements of the cover.

6. In a gas meter attachment, the combination with the register of the meter, of a sliding valve cover indirectly controlling said register, a roller transversely mounted on said cover, and a bearing plate directly superimposed in parallelism with the line of movement of said cover at all times to yieldingly engage and coact with the roller during the reciprocating movements of the cover.

7. In a gas meter attachment, the combination with the register of the meter, of a sliding valve cover indirectly controlling said register, a roller transversely mounted on the top of said cover, a bearing plate directly superimposed over the line of movement of said cover at all times to engage and coact with the roller during reciprocating movements of the cover, and means for adjusting the position of the bearing plate with respect to said roller.

8. In a gas meter attachment, the combination with the register of the meter, of a sliding valve cover indirectly controlling said register, a roller transversely mounted on the top of said cover, a bearing plate directly superimposed over the line of movement of said cover at all times to yieldingly engage and coact with the roller during reciprocating movements of the cover, and means for adjusting the position of the bearing plate with respect to said roller.

HENRY C. MORRIS.